(12) United States Patent
Kinderman et al.

(10) Patent No.: US 7,120,833 B2
(45) Date of Patent: Oct. 10, 2006

(54) ERROR CODES IN AGENT X

(75) Inventors: Shelia Rachel Kinderman, Brasschaat (BE); Thuy Thanh Dao, Centerville, VA (US); Ken Andrews, Reston, VA (US)

(73) Assignee: Alcatel, Paris (FR)

( * ) Notice: Subject to any disclaimer, the term of this patent is extended or adjusted under 35 U.S.C. 154(b) by 788 days.

(21) Appl. No.: 10/132,224

(22) Filed: Apr. 26, 2002

(65) Prior Publication Data

US 2003/0204785 A1    Oct. 30, 2003

(51) Int. Cl.
*G06F 11/00* (2006.01)
(52) U.S. Cl. .......................... 714/43; 709/223
(58) Field of Classification Search ................ 714/43; 379/1.04
See application file for complete search history.

(56) References Cited

U.S. PATENT DOCUMENTS

| | | | |
|---|---|---|---|
| 5,740,368 A | | 4/1998 | Villalpando |
| 5,802,146 A | * | 9/1998 | Dulman .................... 379/32.03 |
| 5,974,568 A | * | 10/1999 | McQueen ................... 714/38 |
| 6,000,046 A | | 12/1999 | Passmore |
| 6,073,162 A | | 6/2000 | Johannsen et al. |
| 6,090,154 A | * | 7/2000 | Jeffries et al. ............... 717/125 |
| 6,122,664 A | | 9/2000 | Boukobza et al. |
| 6,134,680 A | | 10/2000 | Yeomans |
| 6,182,157 B1 | | 1/2001 | Schlener et al. |
| 6,240,457 B1 | | 5/2001 | Bell |
| 6,253,243 B1 | | 6/2001 | Spencer |
| 6,263,366 B1 | | 7/2001 | Jacobs et al. |
| 6,272,131 B1 | | 8/2001 | Ofek |
| 6,286,040 B1 | | 9/2001 | Durham et al. |
| 6,292,829 B1 | | 9/2001 | Huang et al. |
| 6,298,386 B1 | | 10/2001 | Vahalia et al. |

(Continued)

FOREIGN PATENT DOCUMENTS

EP    1 154 601 A1    11/2001

OTHER PUBLICATIONS

Wijnen et al., "V2 To V1 Mapping SNMPv2 onto SNMPv1 within a bi-lingual SNMP Agent", Jan. 1997, Network Working Group.*

(Continued)

*Primary Examiner*—Scott Baderman
*Assistant Examiner*—Gabriel L. Chu
(74) *Attorney, Agent, or Firm*—Sughrue Mion; TThomas C. Gellenthien; V. Lawrence Sewell

(57) ABSTRACT

The solution involves placing additional information in the AgentX error status field. In a preferred embodiment, the Agent X error status field is a 32-bit field. The lower 5 bits are reserved for the SNMP-defined error codes which are very general in nature and, therefore, communicate limited information. Additional error information or specific error codes are placed in the upper 27 bits. As a result, thousands of very specific error codes can be communicated by the AgentX packet to the human operator, thereby allowing the operator to know exactly what is wrong. In another preferred embodiment, the internally defined error code is a 16-bit number—the lower 5 bits are reserved for SNMP-defined error codes and the next 11 bits are used to store an internal portion of the additional error information. In another preferred embodiment, the error status field can be divided into 3 sections. The top 5 bits identify the group of error codes (groups are assigned to teams or to software modules). The middle 6 bits identify a unique code within that range. The lowest 5 bits are reserved for the SNMP error code.

28 Claims, 10 Drawing Sheets

U.S. PATENT DOCUMENTS

| | | | |
|---|---|---|---|
| 6,314,476 B1 | 11/2001 | Ohara | |
| 6,519,635 B1* | 2/2003 | Champlin et al. | 709/223 |
| 6,799,198 B1* | 9/2004 | Huboi et al. | 709/203 |
| 2003/0195922 A1* | 10/2003 | Andrews et al. | 709/202 |

OTHER PUBLICATIONS

Microsoft Press Computer Dictionary Third Edition, "API", Microsoft Press, 1997, p. 28.*

Microsoft Press Computer Dictionary Third Edition, "RAM", Microsoft Press, 1997, p. 395.*

Microsoft Press Computer Dictionary Third Edition, "CLI", Microsoft Press, 1997, p. 101.*

Stevens, "25.2 Protocol", TCP/IP Illustrated, vol. 1: The Protocols, Addison-Wesley, 1994, p. 360-362.*

"SNMP Version 2 Message Formats", TCP/IP Guide, p. 5. [http://www.tcpipquide.com/free/t_SNMPVersion2SNMPv2MessageFormats-5.html].*

"SNMP Message Field Definitions, General Message Format and Message Sections", TCP/IP Guide, p. 1-3. [http://www.tcpipguide.com/free/t_SNMPMessageFieldDefinitionsGeneralMessageFormatand.html].*

"RMON", Linktionary.com [http://www.linktionary.com/r/rmon.html].*

Waldbusser, "RFC 1271", Nov. 1991, Network Working Group.*

Case et al., "RFC 1905", Jan. 1996, Network Working Group.*

Daniele et al., "Agent Extensibility (AgentX) Protocol Version 1" RFC 2741, Jan. 2000, Internet Society.*

Research Disclosure Jun. 2001/1091, Disclosed by International Business Machines Corporation 446195.

Agent Extensibiliby (Agent X) Protocol Version Q, by Daniele, et al., pp. 1-91.

* cited by examiner noError (0),
tooBig (1),
noSuchName (2),
badValue (3),
readOnly (4),
genErr (5),          -- (if none of the other error conditions applies)
noAccess (6),
wrongType (7),
wrongLength (8),
wrongEncoding (9),
wrongValue (10),
noCreation (11),
inconsistentValue (12),
resourceUnavailable (13),
commitFailed (14),
undoFailed (15),
authorizationError (16),
notWritable (17),
inconsistentName (18)

FIG. 6

In the generic TDL files, the following definitions are made:

```
#define APPL_XXX_BASE_ERRORCODES    0x4000
#define E_SNMP_GEN_ERR              0x0005
#define M_ERR_CODE (base, specific, snmp) (base + (specific <<5) + snmp)
```

In the per-team error code TDL files, the per-application or per-subagent codes are defined like this:

```
#define E_APPL_XXX_<name>
 M_ERR_CODE (APPL_XXX_BASE_ERRCODES, <specific number>, <snmp code name>)
``` e.g.,

```
#define E_APPL_XXX_specific_name_abc

M_ERR_CODE (APPL_XXX_BASE_ERRCODES, 1, E_SNMP_GEN_ERR)
define E_APPL_XXX_specific_name_def M_ERR_CODE (APPL_XXX_BASE_ERRCODES, 2, E_SNMP_GEN_ERR)
define E_APPL_XXX_specific_name_ghi
            M_ERR_CODE (APPL_XXX_BASE_ERRCODES, 3, E_SNMP_GEN_ERR)
```

FIG. 7

E_EQM_MGT_DB_UPD_FAILURE,
  "Internal error: Configuration update failed due to database unavailability. Please try again later"
E_EQM_MGT_DB_READ_FAILURE,
  "Configuration retrieval failure. Please try again later"
E_EQM_MGT_MEM_ALLOC_FAILURE,
  "System memory resource failure. Please try again later"
E_EQM_MGT_ERR_IN_IMP_RESPONSE,
  "Unable to retrieve data due to internal communication error. Please try again later"
E_EQM_MGT_ERR_IN_IMP_REQ_FORMATION,
  "Unable to communicate with internal applications. Please try again later"

All of the following (and many more) map to SNMP error code inconsistent Value = 12:

E_IPMGT_MPLS_TRAFFBHVR_LLSP,
  "Traffic behavior can only be set for 1-lsp tunnels"
E_IPMGT_MPLS_ONLYCLASSUSEDBYTUN,
  "Cannot delete - only one classifier row exists and it is used by a tunnel"
E_IPMGT_MPLS_PATH_USEDBYTUN,
  "Cannot delete or modify this path as it is used by a tunnel"
E_IPMGT_MPLS_QOSBHVR_CTPIPE,
  "Qos Class-Traffic Behavior combination of controlTraffic-pipe is not possible"
E_IPMGT_QOS_INCONST_XQOSFQPROFDEFSSR
  "peak-service-rate should be equal to or greater than sustain-service-rate"

FIG. 8

ERROR CODES IN AGENT X

FIELD OF THE INVENTION

The invention is related to the reporting of error information. More particularly, this invention relates to the reporting of very specific error information when using a management protocol.

BACKGROUND OF THE INVENTION

When a configuration command fails, the SNMP protocol sends an error code back to the user. Examples of a configuration command include setting the line speed on a peripheral. An error will occur if that peripheral can't support the line speed. However, SNMP only permits a limited number of error codes. Consequently, many times there is not enough information contained in the code for the operator to know exactly what's wrong. More specifically, in the Agent X standard (RFC 2741) the error status field of a response message is limited to a few AgentX-specific error codes (not applicable to the 7770 RCP architecture), plus the 18 SNMP error status values defined in RFC 1905. This means that the applications may only report one of the 18 error codes defined by SNMP. In the majority of error situations, more specific information about the error is known. However, when the standard SNMP protocol is used, this additional specific information can not be passed back to the user. Consequently, the human operator may be unable to determine exactly why the management operation failed. Thus, he will be unable to correct the error.

SUMMARY OF THE INVENTION

In a preferred embodiment, the invention is a method of generating an error code, comprising the steps of placing additional information in an error status field by reserving lower bits for SNMP error codes and placing additional error information in upper bits.

In another preferred embodiment, the error status field is a 32-bit field, wherein said lower bits are 5 bits and said upper bits are 27 bits.

In still another preferred embodiment, the error status field is a 16-bit field, wherein said lower bits are 5 bits and said upper bits are 11 bits.

In still another preferred embodiment, the error code comprises 3 sections, wherein the 3 sections comprise top bits to identify a group of error codes, middle bits to identify a code within a range of said group of error codes, and lower bits reserved for SNMP error code.

In still another preferred embodiment, the invention further comprises an apparatus to generate error codes, comprising a master agent comprising a processor, at least one subagent operably connected to the master agent, a handler operably connected to said master agent comprising an API stored in memory; and a database operably connected to the handler.

In still another preferred embodiment, the API is MapErrorCode lookup function, the memory is RAM memory, the handler is a Web handler or a CLI handler or a Web and CLI handler.

In still another preferred embodiment, the database is an error code look-up database, whereby said handler looks up an error code in said database.

BRIEF DESCRIPTION OF THE DRAWINGS

FIG. 5(*b*) is a drawing of a 16-bit number internally defined error code with the 16-bit field can also be divided into 3 sections.

FIG. 6 illustrates values defined in RFC 1905 that are used for the SNMP-specific portion of the error code.

FIG. 7 illustrates the steps taken in the C language programming code to assign the additional error information, or bits 5–15, of the error codes.

FIG. 8 contains examples of specific error messages.

DETAILED DESCRIPTION OF THE INVENTION

The standard AgentX error status field of a response message is limited to a few AgentX-specific error codes (ERR), plus the 18 standard SNMP error status values (ERRS). This means that very little information is normally available to assist a human operator at a Web or CLI interface to recover from a problem such as a configuration error.

The present invention comprises an extension to the AgentX protocol and the SNMP Master Agent (MA) processing for a multi-interface management architecture that is modeled using SNMP internally. The extension allows information to be reported back to CLI and WEB operators. In a preferred embodiment, this extension is used in a 7770 RCP router. The code used by the SNMP Master Agent (MA) to map messages between protocols is effectively a filter.

AgentX

An agent monitors and accumulates operational data and detects exceptional events for each network element. There can be one agent for the whole box, or we can have one master agent (MA) and a subagent (SA) for each major software application that we have running. The master agent (MA) communicates with the subagents (SA) through a protocol called AgentX.

Standard SNMP/AgentX Subagent Architecture

Figure 2:
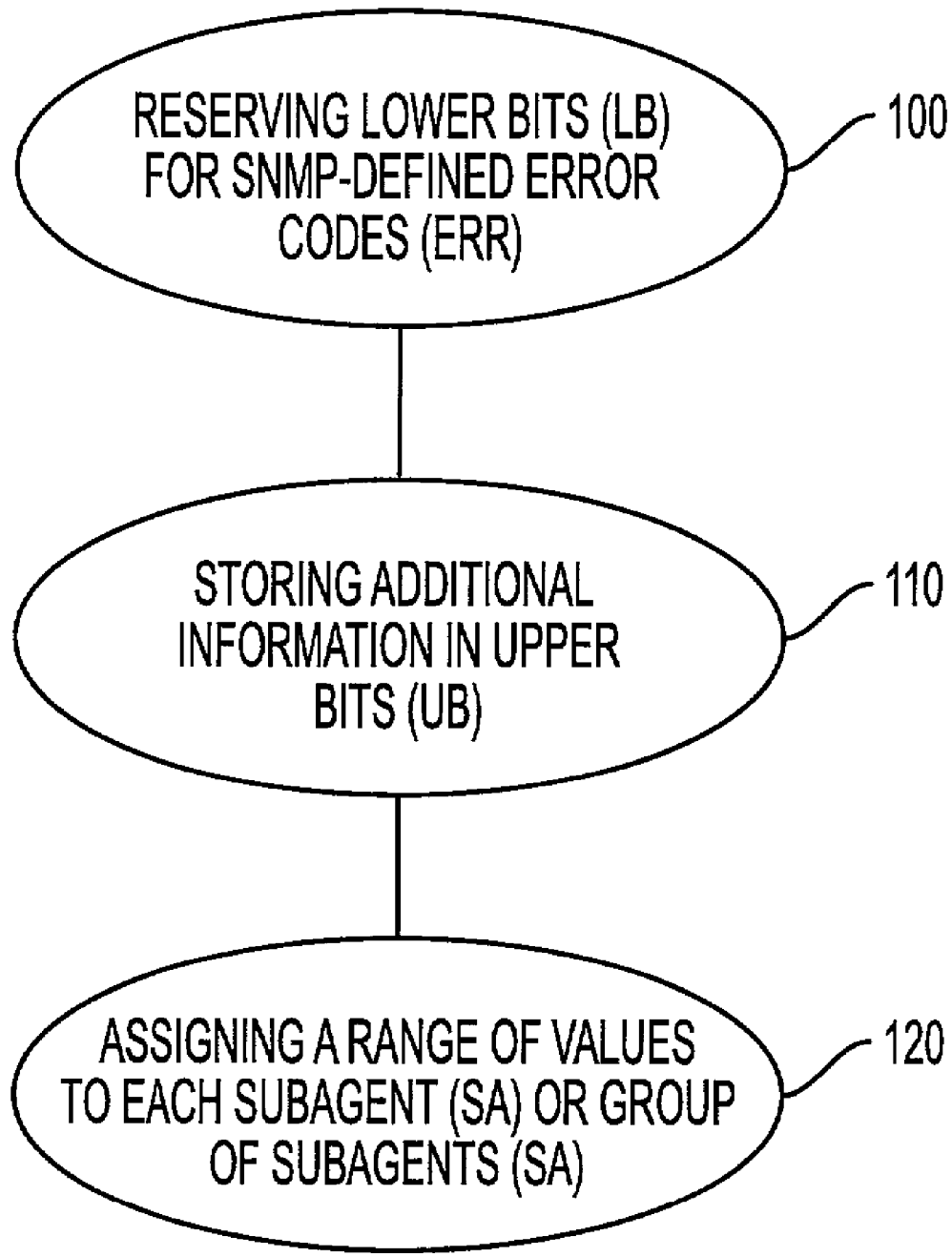
FIG. 2 is a flowchart illustrating the steps taken when placing additional information in the AgentX error status field.
Figure 3:
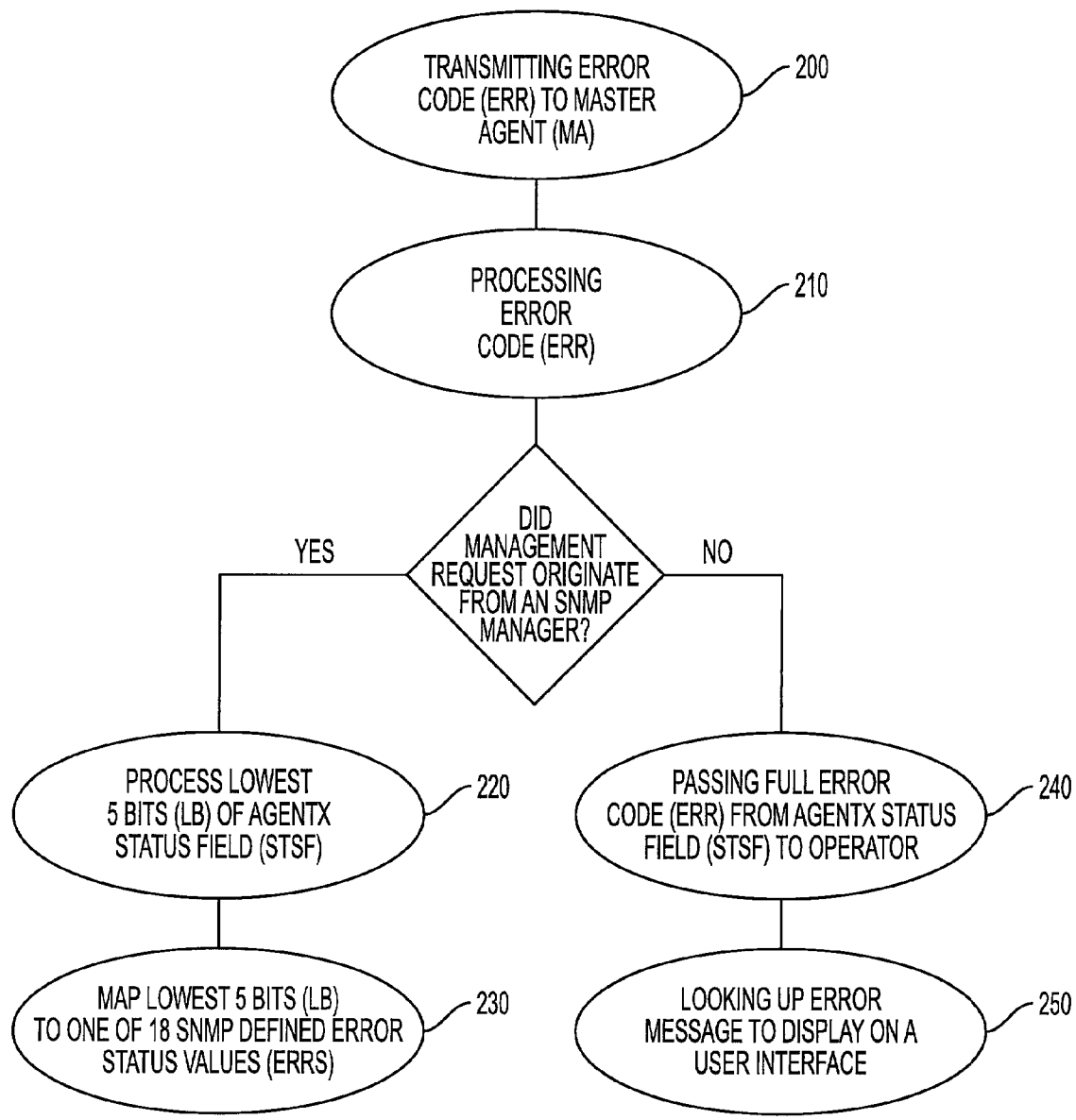
FIG. 3 is a flowchart illustrating the steps taken when the error codes in the AgentX error status field are transmitted and processed.

Many network devices, such as the router described in copending U.S. patent application, SNMP Trap and Inform Shaping Mechanism, Ser. No. 10/118894, filed Apr. 10, 2002, page 3, line 26 to page 5, line 25 and FIG. 1–3, hereby incorporated by reference, use an SNMP Master Agent- Subagent (MA-SA) architecture internally for processing management operations. The Master Agent (MA) receives SNMP messages from external SNMP managers, and distributes them internally as AgentX messages to multiple subagents (SA) within the router (RI). The subagents (SA) route the messages to corresponding applications. The subagents (SA) return responses from the applications to the Master Agent (MA). Each management subagent (SA) may service multiple applications. Typically, a subagent (SA) services one type of application (e.g., IP forwarding) on all boards. In the 7770 RCP router the subagent (SA) can service up to 30 TLKs, although the present invention can apply to systems where each subagent (SA) can service even greater numbers.

Figure 1:
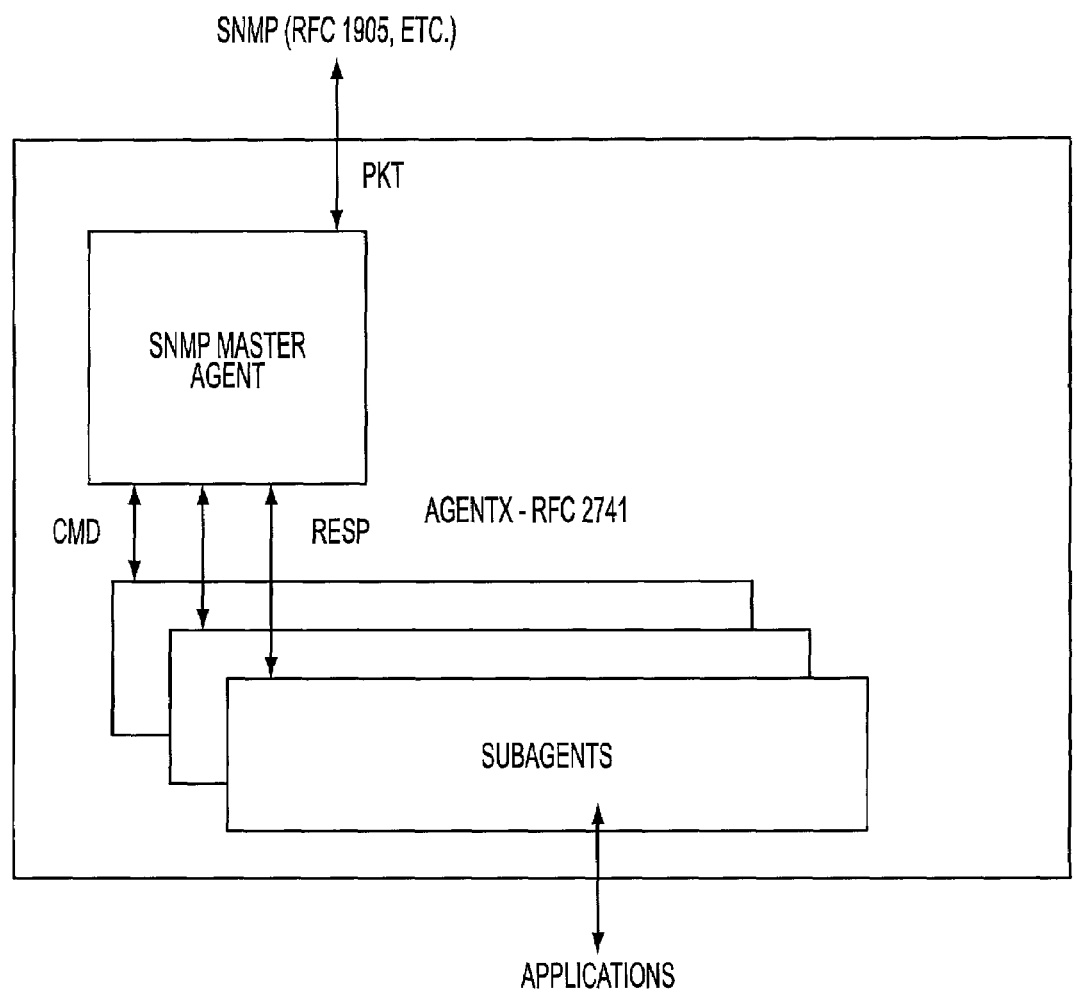
FIG. 1 illustrates an SNMP Master Agent-Subagent architecture.

FIG. 1 discloses a SNMP Master Agent-Subagent (MA-SA) architecture. In FIG. 1, configuration commands (CMD) are sent as AgentX messages to the subagents (SA) that support internal applications. Data or error notifications from internal applications are sent back as AgentX response messages (RESP) towards the Master Agent (MA). See RFC 2741, Daniele, January 2000, Agent Extensibility (AgentX) Protocol Version 1, hereby incorporated by reference. Then, they are translated into SNMP response packets (PKT) containing either data or an SNMP-defined error status value (ERRS). See RFC 1905, Case, January 1996, Protocol Operations for Version 2 of the Simple Network Management Protocol (SNMPv2), hereby incorporated by reference.

Multi-Protocol/AgentX Subagent Architecture.

The 7770 RCP Master Agent-Subagent (MA-SA) architecture of the present invention also includes a link to a Web Interface and a Command Line Interface (CLI). The Web commands and the CLI commands are translated into AgentX messages. They share the same internal processing as the equivalent SNMP commands.

Preferred Embodiment

The solution involves placing additional information in the AgentX error status field (STSF). See FIG. 2. In a preferred embodiment, the Agent X error status field (STSF) is a 32-bit field. The lower 5 bits (LB) are reserved for the SNMP-defined error codes (ERR) which are very general in nature and, therefore, communicate limited information. Additional error information or specific error codes (ERR) are placed in the upper 27 bits (UB). As a result, thousands of very specific error codes (ERR) can be communicated by the AgentX packet to the human operator, thereby allowing the operator to know exactly what is wrong. Generic error codes (ERR) can be used by all subagents (SA) and applications. Specific error codes (ERR) (and the corresponding messages) are arranged into groups, with ranges per subagent (SA). The CLI and Web logic access these error messages via the MapErrorCode Application Programming Interface (API) discussed infra, whose input is the value of the error code (ERR) to be translated into a text string.

As stated above the lower 5 bits (LB), bits 0–4, are reserved for SNMP-defined error codes (ERR) (100). The next 11 bits, upper bits (UB), bits 5–15, are used to store an internal portion of the additional error information, or stated another way, additional error messages to the 18 SNMP error status values (ERRS) defined in RFC 1905 (110). In a preferred embodiment, 500 additional error messages can be stored.

Each subagent (SA) or group of subagents (SA) is assigned a range of values to ensure each is uniquely identified (120). The message code values and the text of the messages are defined in global files. This will ensure consistency. In addition, it could also be used to provide language translation or customization.

The error codes (ERR) in the AgentX error status field (STSF) are transmitted to the Master Agent (MA) by the subagent (SA) (200). See FIG. 3. Next, the Master Agent (MA) processes the error code (ERR) in the following manner (210). (The master agent (MA) uses a processor (P1) to process the error code. (The processor can be a microprocessor, a central processing unit or any of a number of processing means such including analog processing means). It inquires "Does the management request originate from an SNMP manager? (215) If the management request originated from an SNMP manager, the Master Agent (MA) will only process the lowest 5 bits (LB) of the AgentX status field (STSF) because the SNMP operator will only be able to recognize the 18 SNMP error status values defined in RFC 1905 (220). Therefore, these 5 bits map to one of the 18 SNMP defined error status values (ERRS) (230).

Figure 4:
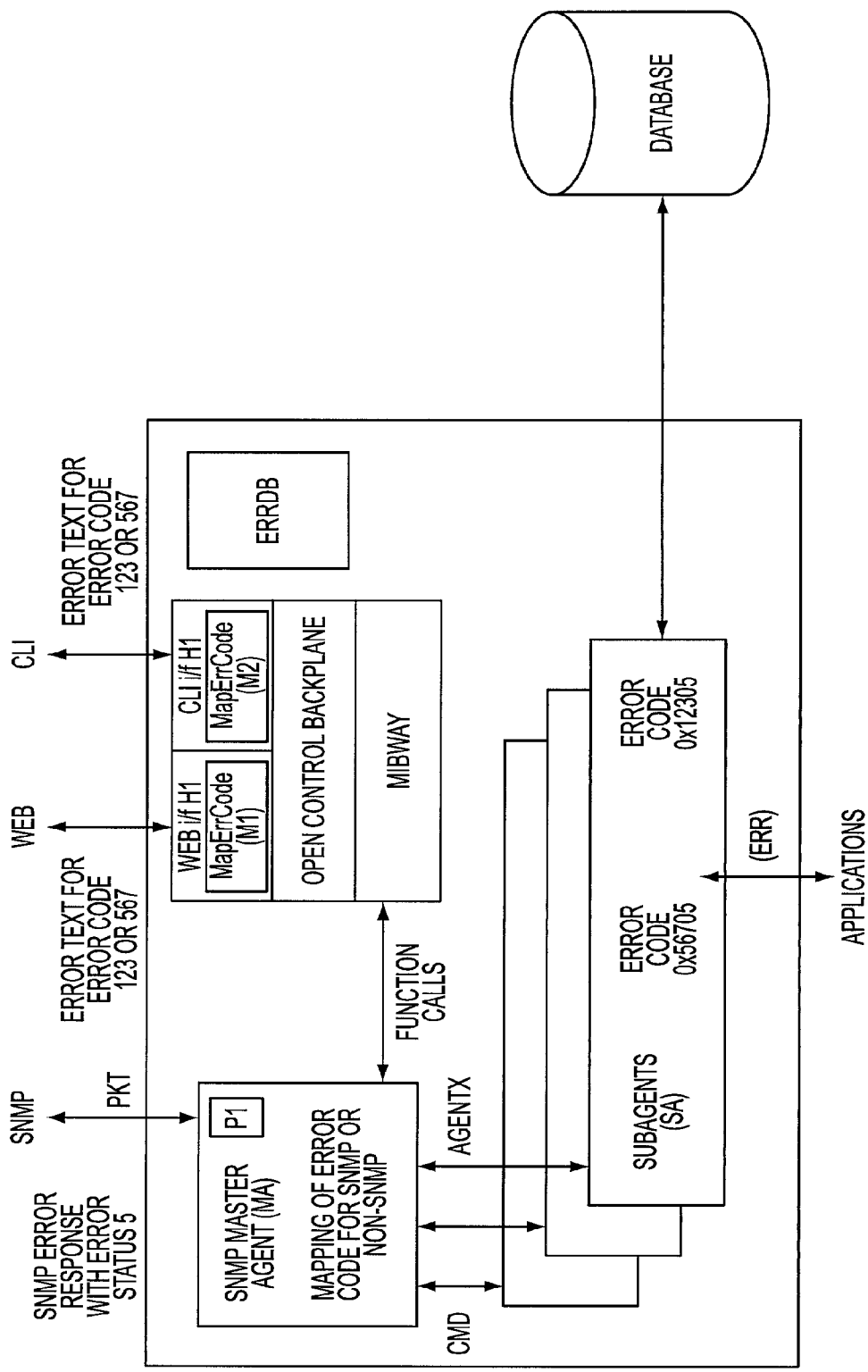
FIG. 4 is a logic block diagram illustrating a master agent passing a full error code from a AgentX error status field to the CLI or Web handler which then looks up an appropriate error message in an error look-up database.

If the management request originated from a Web or a CLI interface, then the Master Agent (MA) passes the full error code (ERR) from the AgentX error status field (STSF) to the CLI or Web software or operator (240). The Web interface or CLI handler then looks up an appropriate error message corresponding to this error message in a error code lookup database (ERRDB) to display on the user interface (250). (See FIG. 4).

The Web handler (H1) or CLI handler (H1) uses a global library function, MapErrorCode, to locate an appropriate error message. The MapErrorCode look-up function is an Application Programming Interface (API). An API is a specification which defines what procedures are followed by an application program when it invokes a defined set of services. It is stored in software (or firmware) located in memory (M1, M2) in the Web interface (Web i/f) or the CLI interface (CLI i/f). The memory can be RAM, ROM, PROM, EPROM. The handler inputs two parameters into MapErrorCode, the error code value and a pointer to the memory where the error text string will be returned by the library function. MapErrorCode retrieves the error text string corresponding to a given error code (ERR). In effect, it translates the error code (ERR) to an error string. MapErrorCode also adds the appropriate prefix, as necessary, and returns the complete error (or warning) string, ready for display to the operator. If the error string for a specified error code (ERR) is not defined in the generic error mapping TDL file, then the MapErrorCode API returns the error string defined for the "genError" code.

Figure 5A:
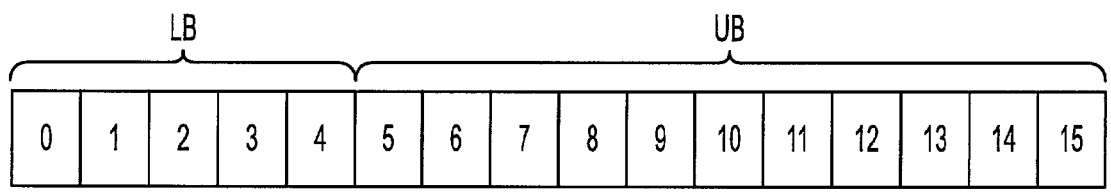
FIG. 5(*a*) is a drawing of a 16-bit number internally-defined error code with 5 lower bits reserved for SNMP-defined error codes and 11 upper bits used to store an internal portion of the additional error information.
Figure 5B:
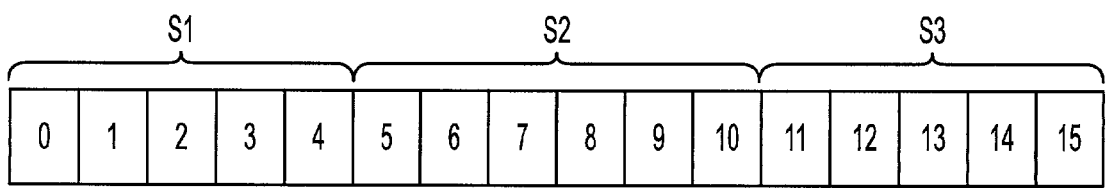

In a preferred embodiment, the internally-defined error code (ERR) is a 16-bit number—the lower 5 bits (LB), bits 0–4, reserved for SNMP-defined error codes and the next 11 bits (UB), bits 5–15, used to store an internal portion of the additional error information. See FIG. 5(*a*). The lower 5 bits (LB) of the internally defined error code (ERR) is the code that will be seen by the SNMP manager. Therefore, it conforms to the SNMP protocol rules.

The 16-bit field can also be divided into 3 sections (S1, S2, S3): The top 5 bits (S1) identify the group of error codes (groups are assigned to teams or to software modules). The middle 6 bits (S2) identify a unique code within that range. The lowest 5 bits (LB) are reserved for the SNMP error code (ERR). See FIG. 5(*b*). In other embodiments, 32 bits are available for the internally defined error code (ERR).

CLI and Web interfaces will display the error code (ERR) as a number, plus the error text message. For read operations (such as internal Gets or GetNext messages, Web monitoring or display of attributes, CLI show or view commands, etc.), the subagents (SA) use the value genErr=5 as the SNMP-specific portion (or lower 5 bits) of any error that they detect. The upper bits (UB) may take on specific values corresponding to one of the 500 additional error messages or specific error messages. For write operations (such as Web or CLI configuration or action commands), the values defined in RFC 1905 and shown in FIG. 6 are used for the SNMP-specific portion of the code.

FIG. 7 shows the steps taken in the C language programming code to assign the additional error information, or bits 5–15, of the error codes (ERR). It illustrates the assignment of the proprietary portion of the error code.

FIG. 8 contains examples of specific error messages all of which map to SNMP error code genErr=5.

Figure 9:
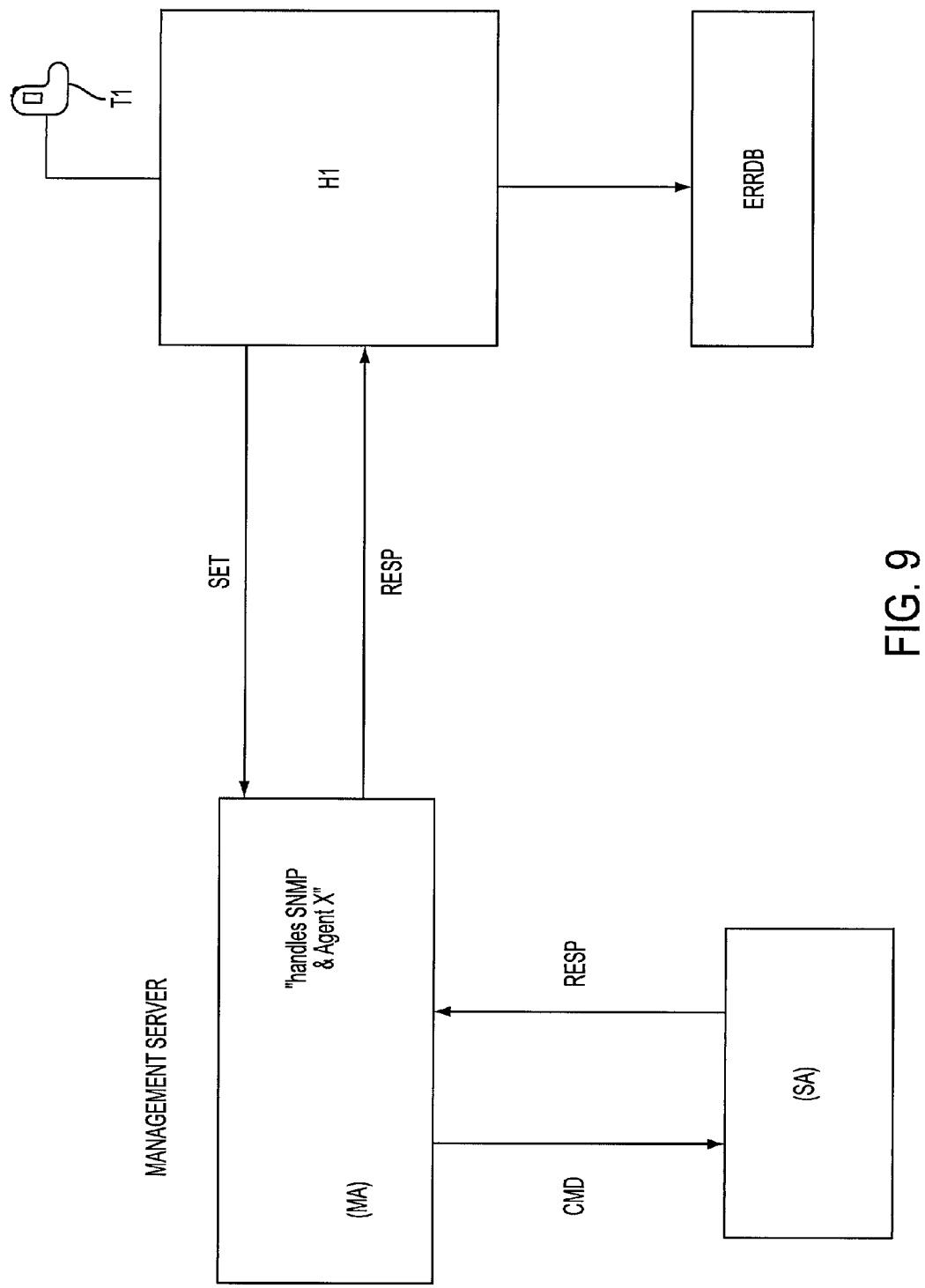
FIG. 9 illustrates how the Web and CLI interface component or handler sends commands in the master agent-subagent architecture.
Figure 10:
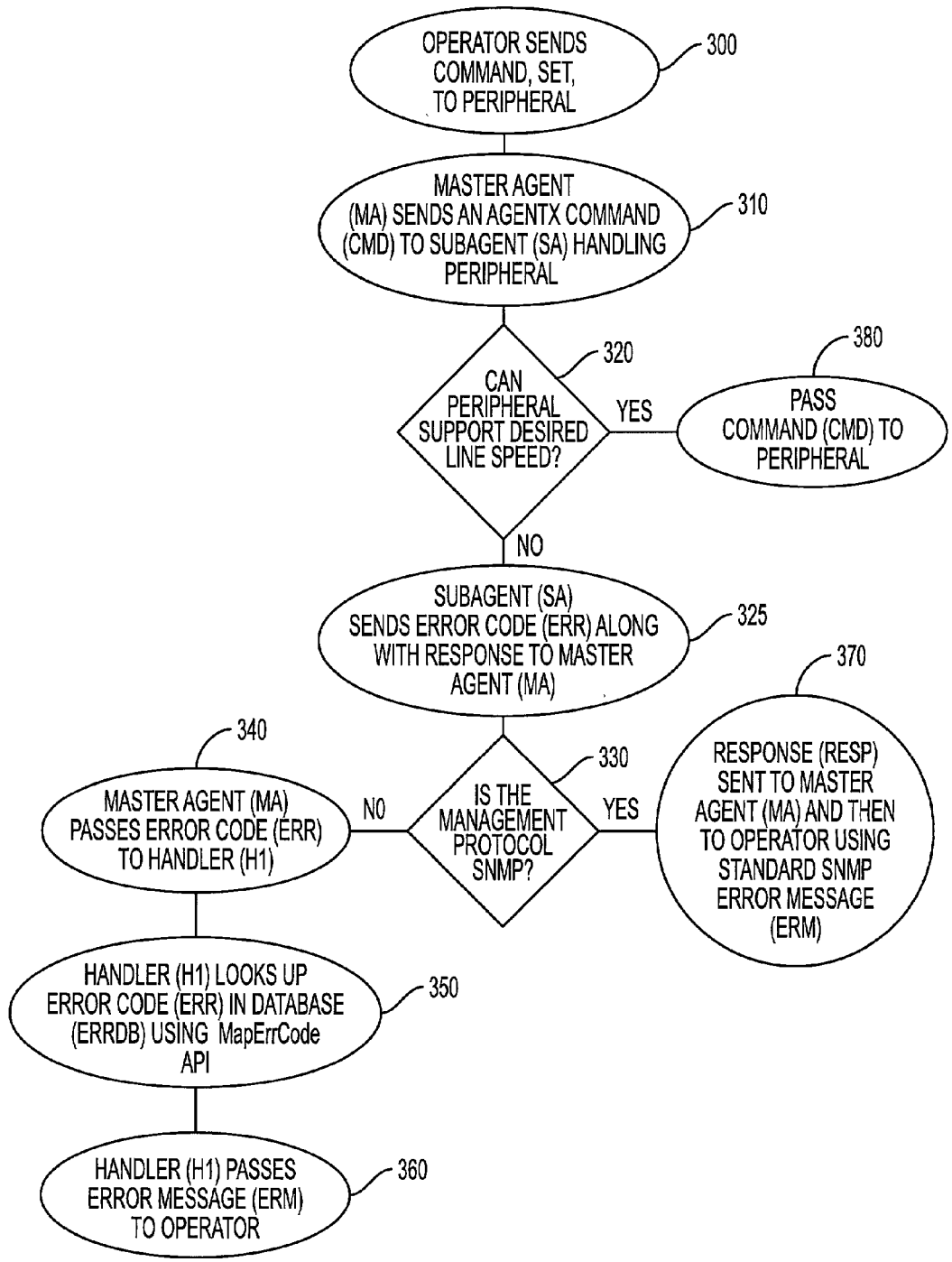
FIG. 10 is a flowchart disclosing the steps taken when the Web and CLI interface component or handler sends commands in the master agent-subagent architecture.

FIG. 9 illustrates how the Web and CLI interface component or handler (H1) sends commands in the 7770 RCP Master Agent-Subagent (MA-SA) architecture. In the present invention, this component can be the Web interface (Web i/f) or the Command Line Interface (CLI i/f). In the example, the operator sends a command to a peripheral (e.g., an OC-3 line card) to set the line speed to 1.5 Mb/s (300). See FIG. 10. The operator does this by sending a Set function call (SET) to the Master Agent (MA) using the CLI interface (CLI i/f). The Master Agent (MA) sends an AgentX command (CMD) or message to a subagent (SA) handling the peripheral (310). The subagent (SA) determines if the peripheral can support the desired line speed. Subagent asks the question, "Can peripheral support desired line speed?" (320). If it can't, then the command is inconsistent with the peripheral's configuration. If the peripheral can't support the desired line speed, then the subagent (SA) will send an error status or error code (ERR), along with its response (RESP), to the Master Agent (MA) (325). The next query is "Is the management protocol SNMP? (330). In the present example, the error code (ERR) is 0×5120C. If the answer is no, the Master Agent (MA) knows that the response along with the error code (ERR) came from within, and passes it along to the Web and CLI interface component or handler (H1) (340). The Web and CLI interface component (H1) will look up the error code (ERR) in a error code lookup database (ERRDB) using the MapErrCode API (350). The error code lookup database (ERRDB) can be any of a variety of means for storing information such as RAM, ROM, PROM or EPROM, etc. In the database, 0×5120C means speed not valid for an OC-3 card. The Web or CLI interface handler (H1) software will pass the associated error message (ERM) along to the operator (360). In a preferred embodiment, the operator can access the command line interface (CMD i/f) using a terminal (T1).

If the peripheral can't support the desired line speed and the management protocol was SNMP, then the response (RESP) from the subagent (SA) would go to the Master Agent (MA) and then to the operator using one of the 18 standard SNMP error messages (ERM) (370). Non SNMP protocols such as the Web or the CLI management protocols support the extended error messages. SNMP doesn't have a look-up table or database (dB) to translate the commands.

If the peripheral can support desired line speed, the command is passed along to the peripheral (380).

While the invention has been disclosed in this patent application by reference to the details of preferred embodiments of the invention, it is to be understood that the disclosure is intended in an illustrative, rather than a limiting sense, as it is contemplated that modifications will readily occur to those skilled in the art, within the spirit of the invention and the scope of the appended claims and their equivalents.

What is claimed is:

1. A method comprising:
   determining, at a sub-agent, an error associated with implementing a command provided by way of a master agent;
   accessing, at the sub-agent, a memory in which the error is associated with an additional error code;
   including the additional error code within an error status field in which lower bits include an SNMP error code and upper bits include the additional error code;
   accessing the error status field; and
   accessing an error code database to determine an error message from the error status field, based at least on the additional error code, the error message being associated with the error.

2. The method according to claim 1, wherein accessing the error status field comprises
   receiving the error status field from the master agent associated with the sub-agent.

3. The method according to claim 1, wherein accessing the error status field comprises:
   receiving at least the additional error code at a handler, the handler associated with a user interface from which the command is received from an operator.

4. The method according to claim 1, wherein accessing an error code database comprises:
   accessing the error code database using a handler, the handler associated with a user interface from which the command is received from an operator; and
   presenting the error message to the operator by way of the user interface.

5. The method according to claim 1, wherein accessing the error status field comprises:
   accessing the error status field of an Agent X error status field associated with a message between the sub-agent and the master agent.

6. The method according to claim 1, wherein accessing the error status field comprises:
   determining that the command did not originate with an SNMP manager.

7. The method according to claim 1, wherein said additional error code comprises:
   upper bits comprising top bits to identify a group of error codes and middle bits to identify a code within a range of said group of error codes.

8. The method according to claim 7, further comprising assigning said range to the subagent.

9. A method of transmitting error codes, comprising:
   transmitting error codes in an error status field; and
   processing said error codes,
   wherein said processing said error codes comprises:
   determining whether the error status field originated from a SNMP manager or from a handler;
   processing lower bits of said error status field if a management request originated from the SNMP manager; and
   passing a full error code from said error status field if said management request originated from the handler.

10. The method according to claim 9, further comprising passing said full error code from said error status field to the handler, the handler including a CLI handler.

11. The method according to claim 10, further comprising looking up an error message to display on a user interface.

12. The method according to claim 9, further comprising passing said full error code from said error status field to the handler, the handler including a Web handler.

13. The method according to claim 12, further comprising looking up an error message to display on a user interface.

14. The method according to claim 9, further comprising looking up an error message to display on a user interface.

15. An apparatus to generate error codes, comprising:
- a master agent comprising a processor;
- at least one subagent operably connected to said master agent and operable to access a memory in response to an error associated with implementing a command provided by way of the master agent, the at least one subagent being further operable to determine an additional error code from the memory in response to the error and transmit an error status field to the master agent in which an SNMP error code and the additional error code are included;
- a handler operably connected to said master agent, comprising:
  - an API stored in memory; and
- an error code lookup database operably connected to said handler,
- wherein the handler is operable to access the API to determine, from the error code lookup database, an error message associated with the additional error code.

16. The apparatus according to claim 15, wherein said memory includes RAM memory.

17. The apparatus according to claim 15, wherein said handler includes a CLI handler.

18. The apparatus according to claim 15, wherein said handler includes a Web handler.

19. The apparatus according to claim 15, wherein said error code lookup database comprises at least one error text string corresponding to the additional error code.

20. The apparatus according to claim 15, wherein said error status field comprises lower bits for the SNMP error code and upper bits for the additional error code.

21. The apparatus according to claim 15, wherein said handler includes a CLI interface; and wherein said handler looks up the additional error code in said error code lookup database using a look-up function.

22. The apparatus according to claim 21, wherein said apparatus includes a router.

23. The apparatus according to claim 15, wherein said error status field comprises:
- upper bits comprising the additional error code and including top bits to identify a group of error codes and middle bits to identify a code within a range of said group of error codes; and
- lower bits reserved for the SNMP error code.

24. The apparatus according to claim 23, wherein said apparatus includes a router.

25. The apparatus according to claim 15, wherein said handler includes a Web interface; and wherein said handler looks up the additional error code in said error code lookup database using a look-up function.

26. The apparatus according to claim 25, wherein said apparatus includes a router.

27. An apparatus to generate error codes, comprising:
- a master agent;
- at least one sub-agent operably connected to said master agent;
- a handler operably connected to said master agent, comprising an API stored in memory; and
- a database operably connected to said handler,
- wherein said API includes a MapErrorCode look-up function.

28. The apparatus according to claim 27, wherein said error code lookup database comprises at least one error text string corresponding to the additional error code.

* * * * *